April 15, 1952     O. B. HOUGH     2,592,900
POWER-OPERATED TREE HACK AND AUTOMATIC LIQUID SPRAYER
Filed March 27, 1946     2 SHEETS—SHEET 1
FIG. 1
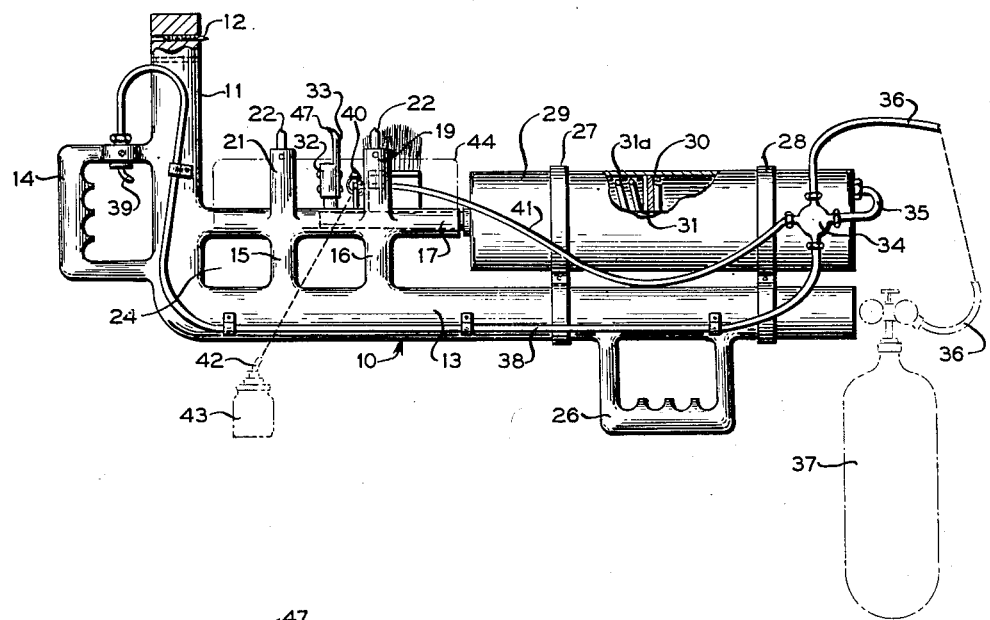
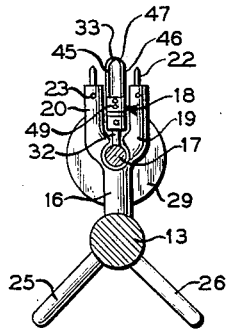
FIG. 2
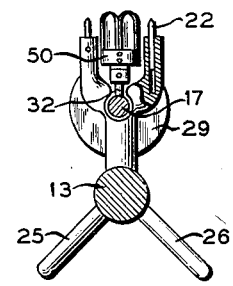
FIG. 3
INVENTOR.
OTTO B. HOUGH
BY
*A. Yates Dowell*
ATTORNEY April 15, 1952     O. B. HOUGH     2,592,900
POWER-OPERATED TREE HACK AND AUTOMATIC LIQUID SPRAYER
Filed March 27, 1946     2 SHEETS—SHEET 2
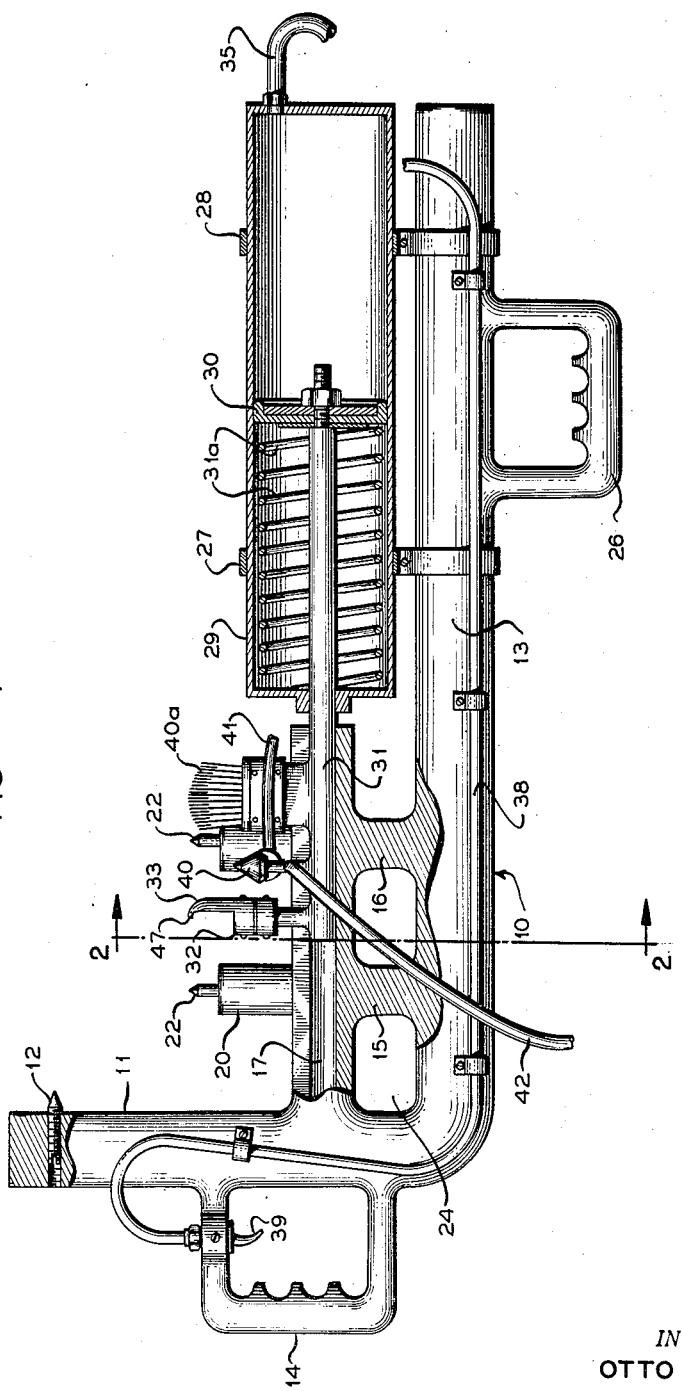
*INVENTOR.*
OTTO B. HOUGH
BY
*A. Yates Dowell*
ATTORNEY Patented Apr. 15, 1952

2,592,900

UNITED STATES PATENT OFFICE 2,592,900

POWER-OPERATED TREE HACK AND AUTOMATIC LIQUID SPRAYER

Otto B. Hough, Tallahassee, Fla.

Application March 27, 1946, Serial No. 657,432

11 Claims. (Cl. 47—12)

This invention relates to improvements in tree hacks such as are used to make cuts in certain types of trees, such as turpentine pine or rubber trees, so that the sap may exude from the tree and be collected in suitable receptacles for processing into commercial products, and particularly to a power operated device or tool for this purpose.

Up to the present time the operation of scarring or gouging trees of the above character has been carried out entirely with hand tools and no power operated tool of this character has so far been found practical. The use of hand tools, however, is slow and laborious and requires a large number of operators and is also inaccurate to a degree that results in poor production from the trees so treated. One of the critical factors involved is the depth of the cut made in the tree. If the cut is too deep, the life of the tree will be adversely effected and if the cut is too shallow the production of sap will be poor.

It is therefore among the objects of the present invention to provide a power operated gouging or scarring tool by means of which the necessary cuts can be quickly made and the depth of the cuts can be accurately controlled to provide the optimum conditions of production and tree life.

It is a further object to provide a power operated scarring or gouging tool of light weight that can be carried about by a single operator and can be so carried for a normal working day without inducing undue fatigue on the part of the operator.

A further object resides in the provision of an improved scarring or gouging tool which has a self-contained acid spray for prolonging the flow of sap from the cuts so that the services of additional workmen to spray the cuts with acid are not necessary.

An additional object resides in the provision of an improved power operated scarring or gouging tool having a source of power of light weight and which may be quickly and easily replenished at necessary intervals.

Other objects and advantages will become apparent as the description proceeds in connection with the accompanying drawings and from the appended claims.

In the drawings:

Fig. 1 is a plan view of the improved power operated tool;

Fig. 2 is a sectional view of the tool on the line 2—2 of Fig. 4;

Fig. 3 is a sectional view similar to Fig. 2 showing a modified form of cutting or gouging tool; and Fig. 4, a plan view of the tool to an enlarged scale and with parts in section for greater clarity.

Referring to the drawings in detail, and particularly to Fig. 1, the tool comprises an elongated supporting member 10 in the form of an L-shaped bar of relatively light weight and high degree of stiffness.

The shorter leg 11 of the member 10 is provided near its end with a screw threaded aperture into which is threaded a pointed screw 12, the axis of which is substantially parallel to the axis of the longer leg 13 of the member 10 and the point of which lies at the inner side of the leg 11. The leg 11 and screw 12 form an abutment the function of which will be later described. A handle 14 of generally rectangular shape is formed on or secured to the leg 11 on the outer side thereof. Extending outwardly from the leg 13 are two spaced supporting elements 15 and 16 which may be of generally cylindrical form and are joined at their outer ends to the adjacent side of a cylindrical guide sleeve 17. Tubular positioning sleeves extend outwardly from the guide sleeve 17, there being two such sleeves opposite each supporting element 15, 16, the two positioning sleeves of each pair being substantially parallel and spaced apart to provide therebetween sufficient space for the cutter head generally indicated at 18 to pass between them. The two sleeves 19 and 20 opposite the supporting element 16 are particularly shown in Fig. 2 and opposite the supporting element 15 there are two similar sleeves, one of which is shown in Fig. 1 and indicated at 21. Each positioning sleeve telescopically receives a pointed member or pin 22, the pins being held in adjusted position in the corresponding sleeves by suitable means such as the screws 23.

The guide sleeve 17 is substantially parallel to the leg 13 and may be joined at one end to the perpendicular leg 11 to provide additional stiffness and rigidity for the support. If desired, the space 24 at the bend of the support member between the leg 11 and support element 15 and the end portions of leg 13 and bearing sleeve 17 may have a web or wall therein (not shown) to additionally reinforce the member.

A pair of handles 25 and 26 also of generally rectangular form are provided on the leg 13 at a location spaced from the leg 11, one of the handles 25 or 26 being used in combination with the handle 14 to hold the tool in operative position against a tree to be provided with a sap exuding cut. The two handles 25 and 26 are provided so that the tool may be conveniently used with either side occupying the top position.

The member 10, including the legs 11 and 13 with the supporting elements 15 and 16, the guide sleeve 17, the positioning sleeves as indicated at 19, 20 and 21 and the handles 14, 25, and 26, is preferably formed as a unitary casting or forging and is preferably made of some strong relatively light weight material, such as an aluminum alloy.

Mounted by suitable clamps 27 and 28 on the end portion of the leg 13 remote from the leg 11 is a cylinder 29. A piston 30 is reciprocable in the cylinder 29 and is mounted on one end of a piston rod 31 which extends through the end of the cylinder facing the leg 11 and into the guide sleeve 17, the longitudinal axis of the cylinder being coincident with the longitudinal axis of the guide sleeve. A bracket member 32 is mounted on the outer end portion of the piston rod and extends upwardly through a longitudinal slot in the guide sleeve 17 and carries a cutting blade 33.

When the piston is reciprocated in the cylinder the piston rod is moved through the guide sleeve 17 and the cutter blade 33 is also moved through the space between the pairs of positioning sleeves. The application of force to the piston is such as to force the cutter head toward the leg 11 of the supporting frame.

A three way valve 34 is mounted on or adjacent to the cylinder 29 and has a fluid channel or conduit 35 connected with the interior of the cylinder through the end wall opposite the leg 11. A conduit 36 leads from a pressure fluid receptacle 37 to the valve 34 and a control element such as a Bowden cable 38 leads from the valve to a control device such as the trigger mechanism 39 mounted on the handle 14 in convenient reach of the operator as he grasps the handle to hold the tool against a tree. When the trigger member 39 is moved in the proper direction the valve will be actuated to connect the conduit 36 with the conduit or channel 35 to apply fluid under pressure to the cylinder and force the piston 30 toward the leg 11 of the supporting frame. After completion of its stroke the piston is returned to its original position by a suitable means such as coil spring 31a received around the piston rod 31.

A spray nozzle 40 is mounted on the piston rod 31 to the rear of the cutter head bracket 32 and is pneumatically connected by a conduit 41 with the valve 34. Bristles 40a are secured to the rod 31 adjacent the nozzle 40 and form a brush. This nozzle is also connected by a suitable conduit or channel 42 with a container 43 for acid solution. This container may be mounted on the tool frame or may be carried separately by the operator and connected with the nozzle 40 by flexible conduit as may be found convenient or desirable. The nozzle 40 is desirably of the aspirating type so that when compressed air is supplied to it through the conduit 41 a mist of acid solution will be sprayed into the fresh cut immediately behind the cutter blade 33 and is brushed by the bristles as the piston rod is returned to its original position. A shield 44 preferably of some acid resisting material is secured to the guide sleeve 17 in position to prevent any of the acid from reaching the hands of the operator or the tool.

The cutter blade may conveniently take the form of a bent strip of metal, such as tool steel, having a pair of substantially parallel straight leg portions 45 and 46 joined by a curved portion 47 which is sharpened to a cutting edge. At the open end of the loop the leg portions are secured in a block 49 which is in turn secured upon the end of the cutter head bracket 32 by suitable means such as the collars and set screws illustrated in Fig. 2.

The modified cutter head shown in Fig. 3 comprises two bent or looped elements 50a similar to the blade 33 of Fig. 1, placed side by side and mounted in an elongated base block 50 which is mounted upon the bracket 32 in a similar manner by a collar and set screws.

The single head of Fig. 2 will open one cut at a time.

The pins 22 are adjustable lengthwise of the corresponding positioning sleeves so that the relationship of the cutter head to the surface of the tree trunk may be accurately controlled and a cut having an average optimum depth may be provided. These pins may be unevenly positioned to compensate for unevenness in the surface of the tree trunk particularly when the tree has been previously scarred and the bark portion is at a different level than the scarred portion so that the tool will be mounted in position with the longitudinal axis of the cutter head substantially at right angles to the longitudinal axis of the tree trunk regardless of the unevenness of the surface of the trunk.

In using the device, the point of screw 12 is set against one side of the tree to provide an abutment and the tool is then moved until the outer ends of the positioning pins 22 are brought into contact with the tree trunk with the tool at the proper inclination to the horizontal to provide a suitable cut. The valve trigger 39 is then tripped admitting air to the cylinder which forces the piston forwardly and moves the cutter head across the trunk of the tree producing a score mark of substantially arcuate cross section in the tree trunk. The positioning members 22 are adjusted for the average diameter of the tree trunks to be operated on so that cuts of a desired average depth will be provided.

Each time the cutter head is driven across a tree trunk the nozzle 40 will follow along and spray a solution of acid into the new made cut. By this means the spraying may be done by the same operator who makes the cut and does not require any additional time or effort on the part of the operator.

In order to be of sufficiently light weight to be conveniently carried by an operator the tank 37 would be of a size which would not ordinarily carry sufficient pressure fluid for an entire day's operation. It is therefore contemplated that replenishing stations will be established at convenient locations in the area occupied by the trees so that the tank may be replenished at convenient intervals from a suitable reservoir. These reservoirs may comprise large tanks which may be carried to the selected locations by truck and which may be kept up to pressure during the day by a suitable mobile compressor and may, if desired, be transported to a central station for filling overnight. It is contemplated that each operator will work within a predetermined radius of such a replenishing station and that his route away from and toward the station will be such as to substantially use up the supply of pressure fluid contained in the portable container.

It is also possible, however, that other means may be used for supplying the pressure fluid without in any way exceeding the scope of the invention. For example, the pressure fluid may be supplied from factory filled cartridges or containers of gaseous material under extremely high pressure so that one such container would last for a considerable length of time and the empty cartridges might be returned to the factory for refilling.

This device provides a light weight and durable tool which with its supply of pressure fluid may be transported by a single operator and will function to rapidly make the desired cuts in the tree trunks without the manual labor previously required to operate hand tools for this purpose. By the use of this tool, the work of scoring or notching the trees is facilitated to an extent such that a much greater number of trees can be conditioned in a day by a single operator and, while the production is thus materially increased, the necessary manual exertion on the part of the operator is greatly reduced.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A power operated tree hack comprising a rigid frame having an abutment member at one end thereof and a power cylinder at the opposite end; a guide sleeve supported on said frame between said cylinder and said abutment member in axial alignment with said cylinder; adjustable positioning means extending from said guide sleeve between said abutment member and said cylinder on the side of said sleeve opposite said frame; a piston reciprocable in said cylinder; a piston rod connected to said piston and slidable in said guide sleeve; a cutter head carried by said piston rod for movement in the space between said abutment member and said cylinder; said positioning means comprising two spaced apart pairs of tubular members with the members of each pair spaced to permit passage of the cutter head between them, and a pointed pin member telescopically received in each tubular member for lengthwise adjustment relative thereto; an actuating valve operatively connected with said cylinder; source of fluid pressure connected with said valve; a valve operating lever; a spray nozzle on said piston rod behind said cutter head; means connecting said nozzle with an acid receptacle and with said valve; and a shield of acid resistant material carried by said frame in position to shield the mechanism of the tree hack and the operator thereof from spray from said nozzle.

2. A power operated tree hack comprising a rigid frame having an abutment member at one end thereof and a power cylinder at the opposite end; a guide sleeve supported on said frame between said cylinder and said abutment member in axial alignment with said cylinder; adjustable positioning means extending from said guide sleeve between said abutment member and said cylinder on the side of said sleeve opposite said frame; a piston reciprocable in said cylinder; a piston rod connected to said piston and slidable in said guide sleeve; a cutter head carried by said piston rod for movement in the space between said abutment member and said cylinder, said cutter head comprising a thin metal member having substantially straight parallel legs and a curved sharpened intermediate portion and a bracket supporting said legs and extending through a longitudinal slot in said guide sleeve to a connection with said piston rod; an actuating valve operatively connected with said cylinder; a source of fluid pressure; a valve operating lever; a spray nozzle on said piston rod behind said cutter head; and means connecting said nozzle with said valve and the source of fluid pressure.

3. A power operated tree hack comprising a rigid frame having an abutment member at one end thereof and a power cylinder at the opposite end; a guide sleeve supported on said frame between said cylinder and said abutment member in axial alignment with said cylinder; adjustable positioning means extending from said guide sleeve between said abutment member and said cylinder on the side of said sleeve opposite said frame; a piston reciprocable in said cylinder; a piston rod connected to said piston and slidable in said guide sleeve; a cutter head carried by said piston rod for movement in the space between said abutment member and said cylinder; an actuating valve operatively connected with said cylinder; a source of fluid pressure connected through said valve to said cylinder; and a valve operating lever mounted on said frame in a position convenient to the operator and connected to said valve for actuation of the same.

4. A power operated tree hack comprising a rigid frame having an abutment member at one end thereof and a power cylinder at the opposite end; a guide sleeve supported on said frame between said cylinder and said abutment member in axial alignment with said cylinder; adjustable positioning means extending from said guide sleeve between said abutment member and said cylinder on the side of said sleeve opposite said frame; a piston reciprocable in said cylinder; a piston rod connected to said piston and slidable in said guide sleeve; a cutter head carried by said piston rod for movement in the space between said abutment member and said cylinder, said cutter head comprising a thin metal member having substantially straight parallel legs and a curved sharpened intermediate portion and a bracket receiving said legs and extending through a longitudinal slot in said guide sleeve to a connection with said piston rod; said positioning means comprising two pointed pin members arranged for lengthwise adjustment; an actuating valve operatively connected with said cylinder; a source of fluid pressure connected to said cylinder through said valve, and operator-controlled means for actuating said valve.

5. A power operated tree hack comprising a rigid frame having an abutment member at one end thereof and a power cylinder at the opposite end; a guide sleeve supported on said frame between said cylinder and said abutment member in axial alignment with said cylinder; adjustable positioning means extending from said guide sleeve between said abutment member and said cylinder on the side of said sleeve opposite said frame; a piston reciprocable in said cylinder; a piston rod connected to said piston and slidable in said guide sleeve; a cutter head carried by said piston rod for movement in the space between said abutment member and said cylinder; and operator-controlled power means for actuating said piston one stroke at a time.

6. A power operated tree hack comprising a rigid frame; a power cylinder fixed to the frame; a guide sleeve supported on said frame in axial alignment with said cylinder; adjustable positioning means on said frame; a piston reciprocable in said cylinder; a piston rod connected to said piston and slidable in said guide sleeve; a cutter head carried by said piston rod for movement in the space between said abutment and said cylinder, said cutter head comprising a thin metal member having substantially straight parallel legs and a curved sharpened intermediate portion and a bracket receiving said legs and extending through a longitudinal slot in said guide sleeve to a connection with said piston rod; and operator-controlled power means for actuating said piston one stroke at a time.

7. A power operated tree hack comprising a rigid frame having an abutment member at one end thereof and a power cylinder at the opposite end; a guide sleeve supported on said frame between said cylinder and said abutment in axial alignment with said cylinder; adjustable positioning means extending from said guide sleeve between said abutment and said cylinder on the side of said sleeve opposite said frame; a piston reciprocable in said cylinder; a piston rod connected to said piston and slidable in said guide sleeve; and a cutter head carried by said piston rod for movement in the space between said abutment and said cylinder.

8. A power operated tree hack comprising a rigid frame, a cutter reciprocable on the frame, a power cylinder on the frame for reciprocating the cutter, control means actuated by the operator to move said cutter to scar or gouge the tree, and means connected to said cutter and movable therewith to spray acid into the cut immediately after it is made.

9. A power operated tree hack comprising a rigid frame, a cutter reciprocable on the frame, a power cylinder for reciprocating the cutter, control means actuated by the operator to move said cutter to scar or gouge the tree, means on the frame adapted to spray acid into the cut immediately after it is made, and brush means movable with the cutter to spread and rub in the acid so sprayed.

10. A power operated tree hack comprising a rigid frame, operator-adjusted means on the frame engageable with a tree for gaging the depth of the cut, a cutter mounted for reciprocation on the frame, a power cylinder drivingly connected to the cutter for reciprocating the cutter, and manual control means on the frame to control the movement of said cutter to scar or gouge the tree.

11. The invention as set forth in claim 10, wherein the cutter consists of a thin metal member having two substantially straight parallel legs and a curved sharpened intermediate portion, and a bracket secured to said legs at the ends thereof.

OTTO B. HOUGH.

REFERENCES CITED

The following references are of record in the file of this patent:

UNITED STATES PATENTS

| Number | Name | Date |
| --- | --- | --- |
| 501,858 | Aldrich | July 18, 1893 |
| 706,481 | Wilson | Aug. 5, 1902 |
| 943,050 | Stone | Dec. 14, 1909 |
| 1,070,339 | Von Hassel | Aug. 12, 1913 |
| 1,702,337 | Davey | Feb. 19, 1929 |
| 2,053,031 | Hessenland | Sept. 1, 1936 |

FOREIGN PATENTS

| Number | Country | Date |
| --- | --- | --- |
| 721,484 | France | Dec. 22, 1931 |
| 258,450 | Germany | Apr. 5, 1913 |